(12) United States Patent
Pronski

(10) Patent No.: US 11,429,942 B2
(45) Date of Patent: Aug. 30, 2022

(54) SYSTEMS AND METHODS FOR TRANSFERRING VALUES IN REMOTE DATABASES

(71) Applicant: The Toronto-Dominion Bank, Toronto (CA)

(72) Inventor: Michael Pronski, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 204 days.

(21) Appl. No.: 16/850,659

(22) Filed: Apr. 16, 2020

(65) Prior Publication Data

US 2021/0326819 A1 Oct. 21, 2021

(51) Int. Cl.
| | |
|---|---|
| *G06F 9/54* | (2006.01) |
| *G06F 16/27* | (2019.01) |
| *G06Q 20/12* | (2012.01) |
| *G06Q 20/32* | (2012.01) |
| *G06Q 20/34* | (2012.01) |
| *G06Q 20/36* | (2012.01) |

(Continued)

(52) U.S. Cl.
CPC .......... *G06Q 20/123* (2013.01); *G06F 9/547* (2013.01); *G06F 16/27* (2019.01); *G06Q 20/351* (2013.01); *G06Q 20/354* (2013.01); *G06Q 20/4012* (2013.01)

(58) Field of Classification Search
CPC .. G06Q 20/123; G06Q 20/351; G06Q 20/354; G06Q 20/4012; G06Q 20/3265; G06Q 20/327; G06Q 20/342; G06Q 20/346; G06Q 20/363; G06Q 20/381; G06F 9/547; G06F 16/27
See application file for complete search history.

(56) References Cited

U.S. PATENT DOCUMENTS

| | | | |
|---|---|---|---|
| 7,017,014 B2* | 3/2006 | Cuomo | ............... G06F 12/0815 711/118 |
| 7,032,067 B2* | 4/2006 | Massard | ................. G06F 21/62 711/113 |
| 8,523,054 B2 | 9/2013 | Yankovich et al. | |

(Continued)

OTHER PUBLICATIONS

Unknown: "Gyft Reports Integration of Gift Cards with Google Wallet", Wireless News; Jacksonville, date of publication: Jul. 23, 2014.

(Continued)

*Primary Examiner* — Clifford B Madamba
(74) *Attorney, Agent, or Firm* — Rowand LLP

(57) ABSTRACT

A method includes receiving a communication identifying a remote database and a first value stored in the remote database that is being transferred to a first entity by a second entity. That first value is capable of being modified by the second entity. Modification of the first value stored in the remote database by the second entity is prevented by identifying an application programming interface allowing operations to be performed on the remote database, and using that API to transfer the first value so as to be associated with one or more other identifiers unknown to the second entity. After modification of the first value stored by the second entity is prevented, a transfer of a second value to a database record associated with the second entity is triggered. Related systems and applications of the method and those systems are also disclosed.

20 Claims, 7 Drawing Sheets

(51) Int. Cl.
*G06Q 20/38* (2012.01)
*G06Q 20/40* (2012.01)

(56) References Cited

U.S. PATENT DOCUMENTS

| | | |
|---|---|---|
| 9,524,500 B2 | 12/2016 | Dave et al. |
| 9,641,598 B1 * | 5/2017 | Yuhan .................... H04L 12/14 |
| 2001/0019614 A1 * | 9/2001 | Madoukh ................ G06F 16/10 |
| | | 380/277 |
| 2003/0145205 A1 * | 7/2003 | Sarcanin ............ G06Q 20/3823 |
| | | 713/172 |
| 2012/0316983 A1 | 12/2012 | Shinnebarger et al. |
| 2012/0323787 A1 | 12/2012 | Nelsen |
| 2013/0275189 A1 | 10/2013 | Goff et al. |
| 2013/0304559 A1 | 11/2013 | Stone et al. |
| 2014/0164093 A1 | 6/2014 | Libman |
| 2015/0088753 A1 | 3/2015 | Van Der Schueren |
| 2016/0104206 A1 | 4/2016 | Greenberg et al. |
| 2019/0164148 A1 | 5/2019 | Suh |
| 2019/0197504 A1 | 6/2019 | Soriano et al. |

OTHER PUBLICATIONS

Borrego-Jaraba et al.: "A Ubiquitous NFC Solution for the Development of Tailored Marketing Strategies Based on Discount Vouchers and Loyalty Cards", Sensors 2013, 13(5), 6334-6354; doi:10.3390/s130506334; May 14, 2013.

* cited by examiner

SYSTEMS AND METHODS FOR TRANSFERRING VALUES IN REMOTE DATABASES

FIELD

This relates to transaction processing in databases, and, more particularly, to the use of application programming interfaces (APIs) for transferring values between database entries in remote databases.

BACKGROUND

Application programming interfaces provide a defined set of functions and/or methods allowing operations to be performed. Application programming interfaces can allow operations to be performed on remote databases such as, for example, to manipulate data stored in entries in those databases. For example, such interfaces may allow operations to be performed on data stored in rows of tables of a relational database.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
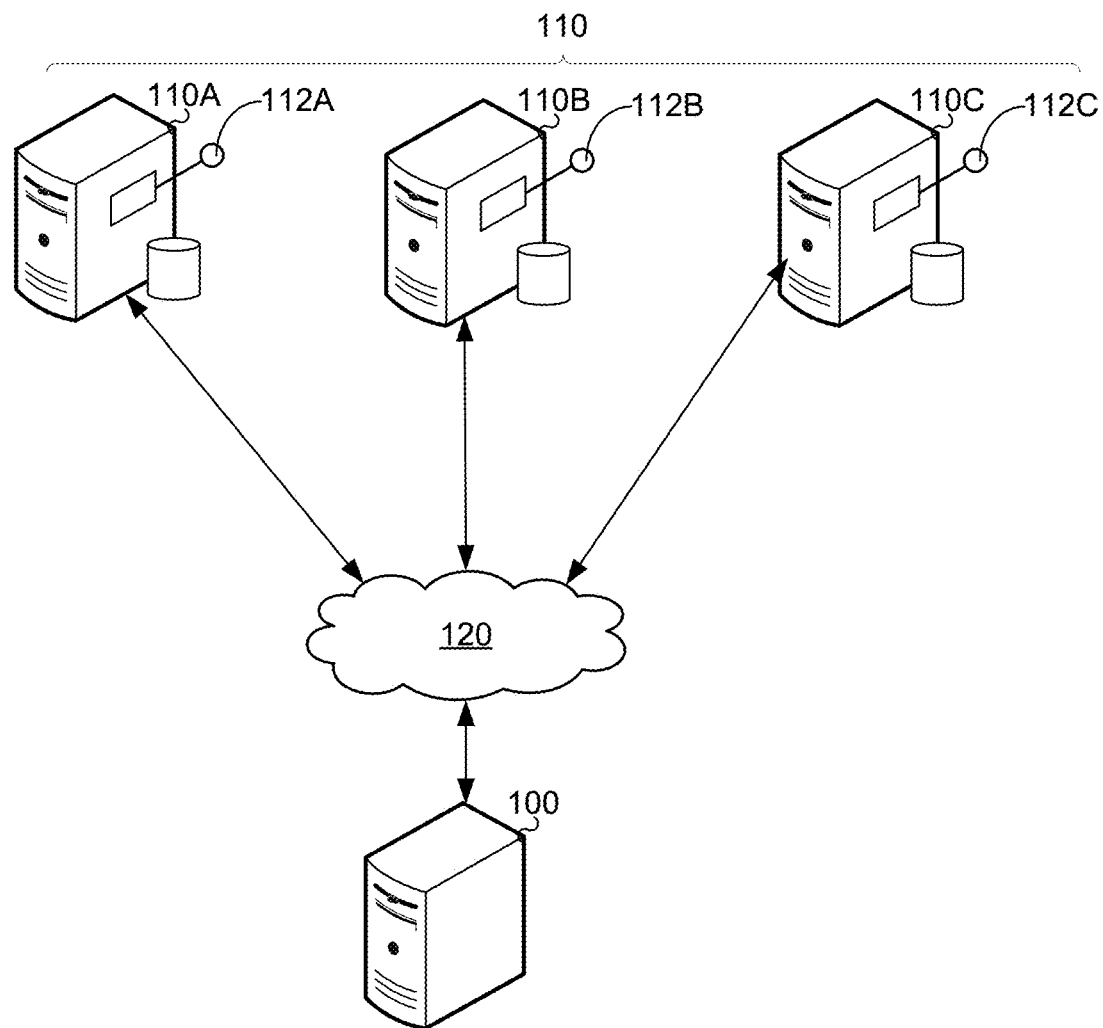
FIG. 1 is a schematic operation diagram illustrating an operating environment of an example embodiment according to the subject matter of the present application.

According to the subject matter of the present application, there may be provided a computer system. The computer system may include a processor. A communications module may be coupled to the processor. A memory may be coupled to the processor. The memory may store instructions that, when executed by the processor, cause the computer system to: receive, using the communications module via a network, a communication identifying a remote database and including one or more identifiers associated with a first value stored in the remote database and being transferred to a first entity by a second entity. The first value may be capable of being modified by the second entity using the identifiers. The instructions, when executed by the processor, may further cause the computer system to: prevent modification of the first value stored in the remote database by the second entity. The preventing may include: identifying, from amongst a plurality of application programming interfaces, an application programming interface allowing operations to be performed on the remote database, and using the identified application programming interface to transfer the first value associated with the one or more identifiers to be instead associated with one or more other identifiers unknown to the second entity. The instructions, when executed by the processor, may further cause the computer system to: after preventing modification of the first value stored in the remote database by the second entity, trigger a transfer of a second value to a database record associated with the second entity, the second value based on the first value.

In this way, a value may be transferred between entities using a remote database application programming interface (API) with one entity transferring a first value to another in entity in exchange for receiving a corresponding transfer of a second value. Notably, the transfer of the first value is performed in an atomic manner, preventing the originating entity from manipulating the transfer such as by interfering with the transfer of the first value while still receiving or attempting to receive the second value. Conveniently, this atomic transfer is accomplished without requiring transaction or locking semantics to be provided by the remote database API. In this way, database values may be transferred to others reliably and safely using a remote database API that does not include/provide transaction or locking operations.

In some implementations, using the identified application programming interface to transfer the first value associated with the one or more identifiers to be instead associated with the one or more other identifiers unknown to the second entity may include: calling a first method of the identified application programming interface to transfer the first value associated with the one or more identifiers to be instead associated with the one or more other identifiers unknown to the second entity; and confirming that the first value initially associated with the one or more identifiers is no longer associated with the one or more identifiers and is instead now associated with the one or more other identifiers. The confirming may include inspecting a return result of the call to the first method of the identified application programming interface. The transfer of the second value to the database record associated with the second entity may be triggered responsive to confirming that the first value initially associated with the one or more identifiers is no longer associated with the one or more identifiers and is instead now associated with the one or more other identifiers.

In some implementations, the first value stored in the remote database may correspond to an amount stored on a stored value card. The stored value card may be of a particular stored value card type. The identified application programming interface may be a stored value card application programming interface allowing operations to be performed on stored value cards of the particular stored value card type. Preventing modification of the first value stored in the remote database by the second entity may further include: using the stored value card application programming interface to create a second, virtual stored value card of the particular stored value card type. The one or more other identifiers may identify the second, virtual stored value card.

In some implementations, the instructions, when executed, may further cause the computer system to: receive, using the communications module via the network, a request to purchase a third virtual stored value card of the particular stored value card type storing a particular value; and search a pool of virtual stored value cards to identify a virtual stored value card matching the request. The pool of virtual stored value cards may include the second, virtual stored value card. The instructions, when executed, may further cause the computer system to: satisfy the request to purchase the third virtual stored value card using the second, virtual stored value card.

In some implementations, the instructions, when executed, may further cause the computer system to: after preventing modification of the first value stored in the remote database by the second entity, use the stored value card application programming interface to cancel the stored value card.

According to the subject-matter of the present application, there may be provided a computer-implemented method. The method may include: receiving, via a network, a communication identifying a remote database and including one or more identifiers associated with a first value stored in the remote database and being transferred to a first entity by a second entity. The first value may be capable of being modified by the second entity using the identifiers. The method may further include: preventing modification of the first value stored in the remote database by the second entity. The preventing may include: identifying, from amongst a plurality of application programming interfaces, an application programming interface allowing operations to be performed on the remote database, and using the identified application programming interface to transfer the first value associated with the one or more identifiers to be instead associated with one or more other identifiers unknown to the second entity. The method may further include: after preventing modification of the first value stored in the remote database by the second entity, triggering a transfer of a second value to a database record associated with the second entity, the second value based on the first value.

In some implementations, using the identified application programming interface to transfer the first value associated with the one or more identifiers to be instead associated with the one or more other identifiers unknown to the second entity may include: calling a first method of the identified application programming interface to transfer the first value associated with the one or more identifiers to be instead associated with the one or more other identifiers unknown to the second entity; and confirming that the first value initially associated with the one or more identifiers is no longer associated with the one or more identifiers and is instead now associated with the one or more other identifiers. The confirming may include inspecting a return result of the call to the first method of the identified application programming interface. The transfer of the second value to the database record associated with the second entity may be triggered responsive to confirming that the first value initially associated with the one or more identifiers is no longer associated with the one or more identifiers and is instead now associated with the one or more other identifiers.

In some implementations, the first value stored in the remote database may correspond to an amount stored on a stored value card.

In some implementations, the stored value card is a physical stored value card.

In some implementations, the one or more identifiers may include a card number of the stored value card and a PIN code of the stored value card.

In some implementations, the stored value card may be of a particular stored value card type. The identified application programming interface may be a stored value card application programming interface allowing operations to be performed on stored value cards of the particular stored value card type.

In some implementations, the one or more other identifiers may identify a second, virtual stored value card of the particular stored value card type.

In some implementations, preventing modification of the first value stored in the remote database by the second entity may further include: using the stored value card application programming interface to create the second, virtual stored value card.

In some implementations, the second, virtual stored value card may be used for pooling values transferred from stored value cards of the particular stored value card type.

In some implementations, the method may further include: receiving, via the network, a request to purchase a third virtual stored value card of the particular stored value card type storing a particular value; searching a pool of virtual stored value cards to identify a virtual stored value card matching the request, the pool of virtual stored value cards including the second, virtual stored value card; and satisfying the request to purchase the third virtual stored value card using the second, virtual stored value card.

In some implementations, triggering the transfer of the second value to the database record associated with the second entity may include: using a second stored value card application programming interface to create a new virtual stored value card of a different stored value card type; and using the second stored value card application programming interface to load the new virtual stored value card with the second value.

In some implementations, the transfer of the second value to the database record associated with the second entity may correspond to a payment to the second entity.

According to the subject-matter of the present application, there may be provided a computer-readable medium. The medium may be non-transitory. The medium may be a storage medium. The medium may store instructions that, when executed by a processor of a computer system, cause the computer system to perform the above-discussed method.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

FIG. 1 is a schematic operation diagram illustrating an operating environment of an example embodiment.

As illustrated, a server computer system 100 is in communication with a set of remote database computer server systems 110 via a network 120. For example, as illustrated, the server computer system 100 may be in communication with a first remote database computer server system 110A, a second remote database computer server system 110B, and a third remote database computer server system 110C, all via the network 120. Each member of the set of remote database computer server systems 110 may maintain and/or provide access to one or more respective databases.

The server computer system 100 and each member of the set of remote database computer server systems 110 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 120 is a computer network. In some embodiments, the network 120 may be an internetwork such as may be formed of one or more interconnected computer networks. For example, such a network may be or may include an Ethernet network, an asynchronous transfer mode (ATM) network, a wireless network, or the like. In some embodiments, the network 120 may be the Internet.

The server computer system 100 allows access to/modification of remote databases. Such accesses and modifications may occur/be performed in real-time and/or near real-time. The server computer system 100 co-operates with the set of remote database computer server systems 110 via the network 120 to perform operations relative to remote databases. To perform those operations, the server computer system 100 may invoke one or more functions exposed by application programming interfaces (APIs) provided by a given member of the set of remote database computer server systems 110. For example, as illustrated, each of the first remote database computer server system 110A, the second remote database computer server system 110B, and the third remote database computer server system 110C provides a respective remote database application programming interface (API), namely a first remote database API 112A, a second remote database API 112B, and a third remote database API 112C. Each of these remote database APIs may allow performing of operations on one or more of the one or more databases maintained by/accessible using the one of the set of remote database computer server systems 110 providing that API.

As mentioned above, each of the server computer system 100 and the members of the set of remote database computer server systems 110 (e.g., the first remote database computer server system 110A, the second remote database computer server system 110B, and the third remote database computer server system 110C) is a computer system. An example computer server system 200 will now be discussed with reference to FIGS. 2 and 3. Suitably-configured instances of the example computer server system 200 may, in some implementations, serve as and/or be a part of the server computer system 100 and/or of one or more members of the set of remote database computer server systems 110.

Figure 2:
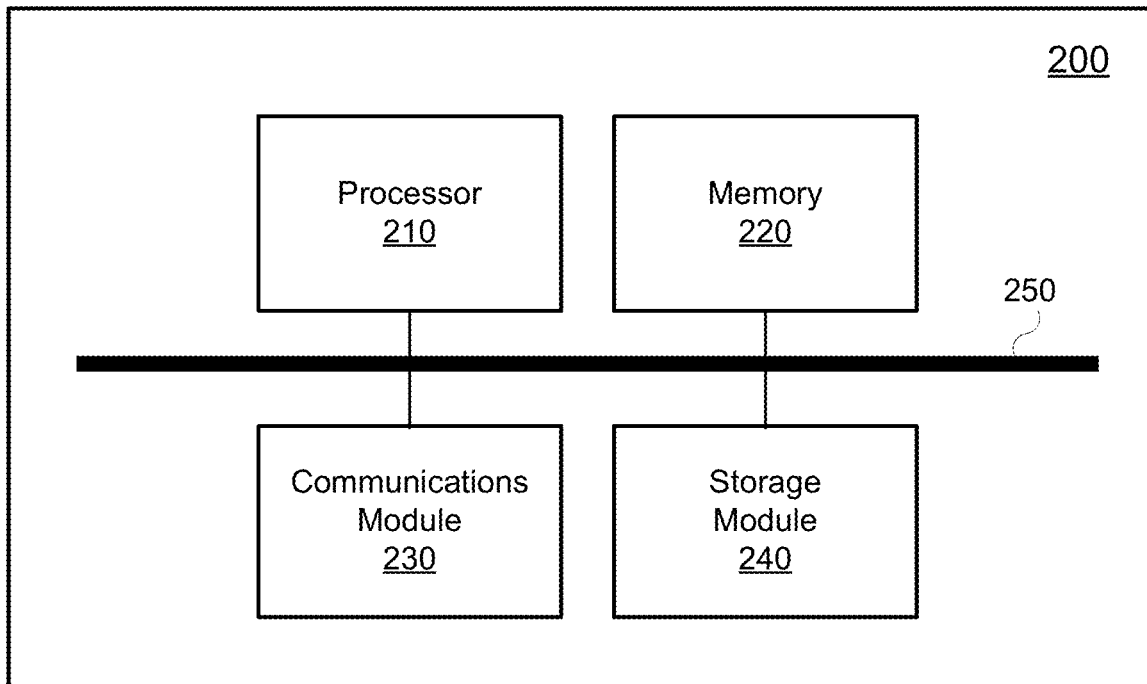
FIG. 2 is high-level schematic diagram of an example server computer system.

FIG. 2 is a high-level schematic diagram of an example computer server system 200.

The example computer server system 200 includes a variety of modules. For example, as illustrated, the example computer server system 200 may include a processor 210, a memory 220, a communications module 230, and/or a storage module 240. As illustrated, the foregoing example modules of the example computer server system 200 are in communication over a bus 250. As such, the bus 250 may be considered to couple the various modules of the example computer server system 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer server system 200.

The communications module 230 allows the example computer server system 200 to communicate with other computing devices and/or various communications networks such as, for example, the network 120. The communications module 230 may allow the example computer server system 200 to send or receive communications signals. Communications signals may be sent or received according to one or more protocols or according to one or more standards. For example, the communications module 230 may allow the example computer server system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computer server system 200 to communicate via Wi-Fi (TM), using Bluetooth (™) or via some combination of one or more networks or protocols. In some embodiments, all or a portion of the communications module 230 may be integrated into a component of the example computer server system 200. For example, the communications module may be integrated into a communications chipset.

The storage module 240 allows the example computer server system 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
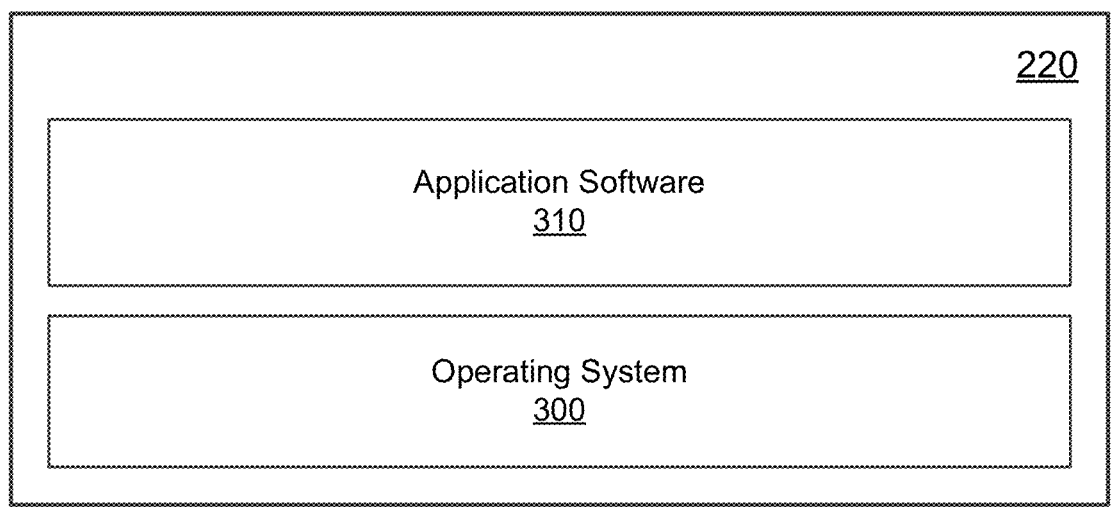
FIG. 3 shows a simplified organization of software components stored in the example server computer system of FIG. 2.

FIG. 3 depicts a simplified organization of software components stored in the memory 220 of the example computer server system 200. As illustrated, these software components include an operating system 300 and an application software 310.

The operating system 300 is software. The operating system 300 allows the application software 310 to access the processor 210, the memory 220, the communications module 230, and the storage module 240 of the example computer server system 200. The operating system 300 may be, for example, UNIX (™), Linux (™), Microsoft (™) Windows (™), Apple OSX (™) or the like.

The application software 310, when executed, co-operates with the operating system 300 to adapt the example computer server system 200 for some purpose and to provide some defined functionality. For example, the application software 310 may cooperate with the operating system 300 to adapt one or more suitable embodiments of the example computer server system 200 to serve as the server computer system 100 or as one of the members of the set of remote database computer server systems 110.

Figure 4:
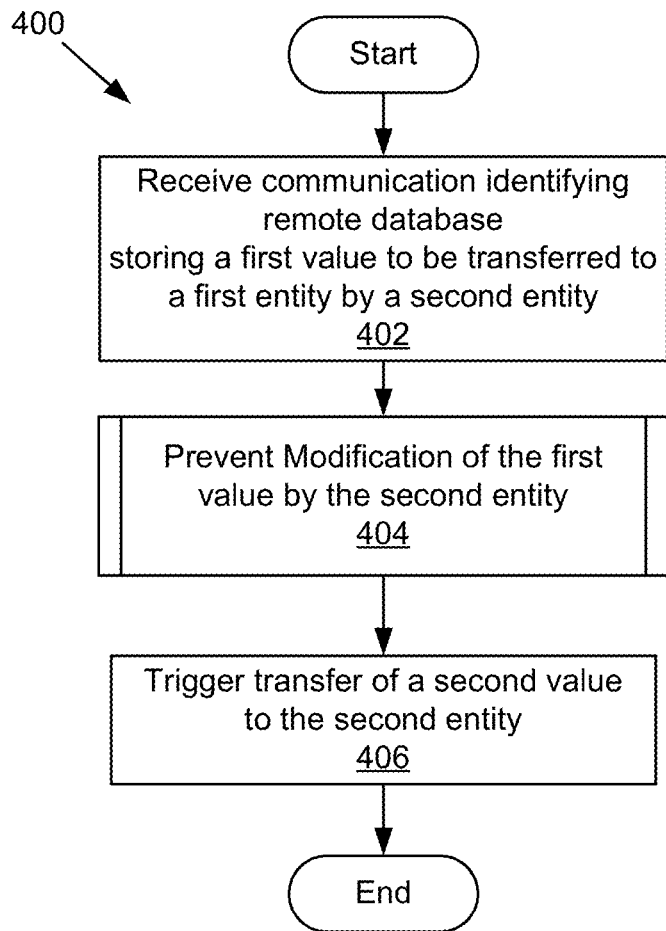
FIG. 4 is a flowchart showing operations performed in transferring a value in a remote database.

FIG. 4 provides a flowchart illustrating a method 400 for processing a request for a transfer of a data value. In performing the method 400, operations starting from an operation 402 and continuing onward are performed by a processor of the server computer system 100. For example, where the server computer system 100 is or includes an instance of the example computer server system 200, the operations may be performed by the processor 210 executing instructions such as, for example, from the memory 220. Those instructions may, for example, be part of a suitable instance of the application software 310 (FIG. 3).

At the operation 402, the server computer system 100 receives a communication. The communication may be received via a network. The communication may be received by the server computer system 100 using a communications module thereof. For example, where the server computer system 100 is or includes an instance of the example computer server system 200, the communication may be received using the communications module 230.

The communication may identify a remote database. For example, the communication may identify one of the databases maintained by/accessible via the set of remote database computer server systems 110. A first value may be stored in a remote database (e.g., the identified database). The communication may be or may correspond to a request to transfer that data value—i.e. a request to transfer the first value. The communication may identify the first value. The first value may be being transferred to a first entity by a second entity. As such, the first value may be considered associated with the second entity and/or may be modifiable by the second entity. For example, the first value may be owned by/associated with the second entity and once transferred will instead be owned by/associated with the first entity. The communication may include one or more identifiers associated with the first value. For example, such an identifier could be or include a database key identifying a row storing the first value. The one or more identifiers may be known to and/or usable by the second entity to affect the first value. For example, the one or more identifiers may be usable to mutate and/or transfer the first value. In a particular example, where the identifiers are or include a key, that key may be usable to perform operations on a database row identified by that key so as to, for example, allow modification of the first value.

Following the operation 402, an operation 404 is next.

As mentioned above, the first value is, due to its association with the second entity, susceptible to modification by the second entity. At the operation 404, the modification of the first value by the second entity is prevented. Notably, this preventing may also have the side effect of disassociating the first value from the second entity. More particularly, the first value may be disassociated from the second entity with its association changed to instead be associated with the first entity. Put another way, the operation 404 may have the side-effect of effecting the transfer of the first value from the second entity to the first entity.

An example manner of preventing modification of the first value stored in the remote database by the second entity will now be described with reference to FIG. 5.

Figure 5:
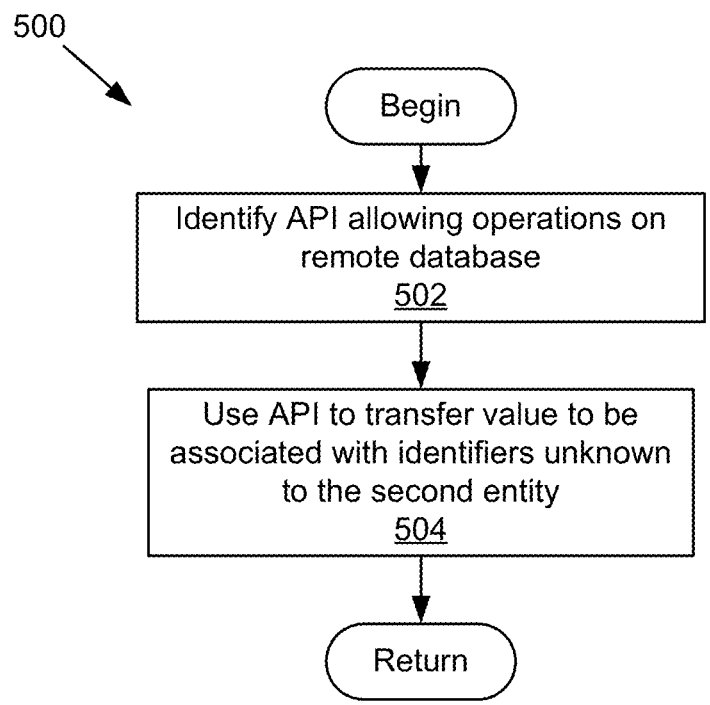
FIG. 5 is a flowchart showing operations performed in preventing modification of a value in a remote database.

FIG. 5 provides a flowchart illustrating a method 500 for preventing modification of the first value stored in the remote database by the second entity. The method 500 may be employed in some implementations of the method 400 (FIG. 4), and, in particular, in some implementations of the operation 404 of the method 400. Notably, the method 500 may, in some implementations, be a sub-method of the method 400 and this may be reflected in at least some such implementations. For example, it may be that the method 500 is implemented a subroutine called by an implementation of the method 400 (e.g., with that subroutine being called in/by an implementation of the operation 404).

In performing the method 500, operations starting from an operation 502 and continuing onward are performed by a processor of the server computer system 100. For example, where the server computer system 100 is or includes an instance of the example computer server system 200, the operations may be performed by the processor 210 executing instructions such as, for example, from the memory 220. Those instructions may, for example, be part of a suitable instance of the application software 310 (FIG. 3).

At the operation 502, an application programming interface (API) allowing operations on the remote database storing the first value is identified. As the identified API allows performing of database operations, it may be considered a remote database application programming interface. The API may be identified based on the remote database. For example, it may be that information identifying the remote database is employed in identifying the API. In a particular example, it may be that information identifying the database (e.g., the information as may be received as a part of the communication received at the operation 402) includes information identifying the API or that allows identification of the API such as, for example, by performing a look-up based on the information identifying the database. The identified API may take a variety of forms. For example, where the remote database is a database maintained by/accessible using a remote database computer server system of the set of remote database computer server systems 110, the API may be an API provided by that remote database computer server system (e.g., one of the first remote database API 112A, the second remote database API 112B, or the third remote database API 112C).

However identified, following identification of an API allowing operations to be performed on the remote database at the operation 502, an operation 504 is next.

At the operation 504, the identified application programming interface is used to transfer the first value from being associated one or more identifiers associated with a second entity to be instead associated with one or more other identifiers unknown to the second entity.

The transfer of the first value away from being associated with the second entity may be effected using the application programming interface identified at the operation 502. Notably, depending on one or both of the implementation of the method 500 and the specifics of the identified application programming interface (e.g., the primitives provided thereby), it may be that various manners of effecting the transfer may be employed in a particular implementation/circumstance.

As example of a possible manner of transfer, it may be that the identified application programming interface provides one or more methods/primitives to allow modification/mutation of data stored in the remote database. Such a primitive may be invoked/called (e.g., by way of a suitable remote procedure call and/or the sending of a communication and/or the like) so as to cause the first value to be transferred from being associated with one or more identifiers associated with the second entity to be instead associated with one or more other identifiers unknown to the second entity. For example, it may be that the transfer causes the first value to be instead associated with one or more identifiers associated with the first entity. Notably, this may have the effect of both preventing the second entity from modifying the first value and of effecting a transfer of the first value to the first entity. Such a transfer may be performed in a variety of manners. For example, it could be that one or more database keys of a row storing the first value are changed to new values that are not associated with the second entity (and which may be associated with the first entity) by invoking a suitable primitive of the identified API. In another example, it could be that a row storing the first value is deleted and atomically replaced with a new row storing the first value, with the new row being associated with the first entity instead of the second entity (e.g., by storing one or more values associated with the first entity in that row and/or by having the new row stored in a different logical location within the database).

That the use of the API to transfer the first value to instead be associated with identifier(s) unknown to the second entity was successful may be confirmed as a part of the operation 504. Put another way, it may be confirmed that the first value initially associated with the one or more identifiers is now no longer associated with the one or more identifiers is instead now associated with one or more other identifiers. Notably, such confirming may take a variety of forms. For example, it could be that a return result of the call to the method of the identified API is inspected (e.g., to make sure no error occurred). In another example, another primitive of the identified API may, additionally or alternatively, be invoked/called in order to confirm that the data in the database was properly updated/modified so as to have effected the transfer.

Notably, where the method 500 is employed in implementing the operation 404 (FIG. 4) of the method 400, the performing of the operation 504 as a part of the operation 404 may imply that that performing of the operation 404 has the side effect of causing the first value to no longer be associated with the second entity. In particular, the first value may, as a side effect of the operation 404, be transferred from being associated with the one or more identifiers associated with the first value (e.g., as may have been received at the operation 402) to instead being associated with one or more identifiers associated with the first entity. In this way, the intended transfer of the first value to the first entity discussed above in association with the operation 402 may be effected at the operation 404 the same time that modification of the first value by the second entity is prevented.

The method 500 completes with the completion of the operation 504. Where the method 500 is employed in an implementation of the operation 404 (FIG. 4) of the method 400, the completion of the method 500 may also correspond to completion of the operation 404.

Returning to consideration of FIG. 4, however the operation 404 is implemented, following the preventing of the modification of the first value stored in the remote database by the second entity completion at the operation 404, an operation 406 is next.

At the operation 406, a transfer of a second value to a database record associated with the second entity is triggered. In some cases, the database record associated with the second entity may be in the same database as that in which the first value is stored. That record could, however, alternatively be in a different database. Notably, however, even if the database record is in a different database, by employing the method 400, the need for cross-database transaction semantics (e.g., to avoid the second entity exploiting a race condition to fraudulent ends) may be avoided while still allowing the transfer of the second value to be conditioned on the prevention of modification of the first value by the second identity. For example, a race condition whereby the second entity is able to modify the first value while also receiving a transfer of the second value may be avoided.

In some implementations, the transfer of the second value to the database record associated with the second entity may be triggered responsive to confirming that the first value initially associated with the one or more identifiers is no longer associated with the one or more identifiers and is instead now associated with one or more other identifiers. For example, this may be the case in implementations that employ the method 500 (FIG. 5) in the implementation of the operation 404 and in particular in such implementations where the implementation of the operation 504 of method 500 includes processing to confirm that the first value initially associated with the one or more other identifiers is no longer associated therewith (and is instead associated with other identifier(s)) as discussed above. In a particular example, it may be that the transfer is triggered responsive to confirming that a success/OK return result was received from one or more remote database API methods/calls (e.g., as may have been invoked as a part of the performing of the operation 404 and/or the operation 504).

Notably, as mentioned above, the method 400 (and also the method 500) can be implemented without requiring transaction and/or locking operation to be performed. As such, the method 400 may be employed in allowing a transfer of a value stored in a remote database to be effected using an application programming interface allowing manipulation thereof even where that API does not include/provide one or both of transaction and locking operations. For example, a need for distributed transaction functionality may be avoided.

The subject matter of the present application may be employed beneficially in a variety of possible applications. An example scenario in which the subject matter of the present application is applied in managing electronic stored value cards (sometimes referred to gift cards) will now be discussed with reference to FIGS. 6-8.

Figure 6:
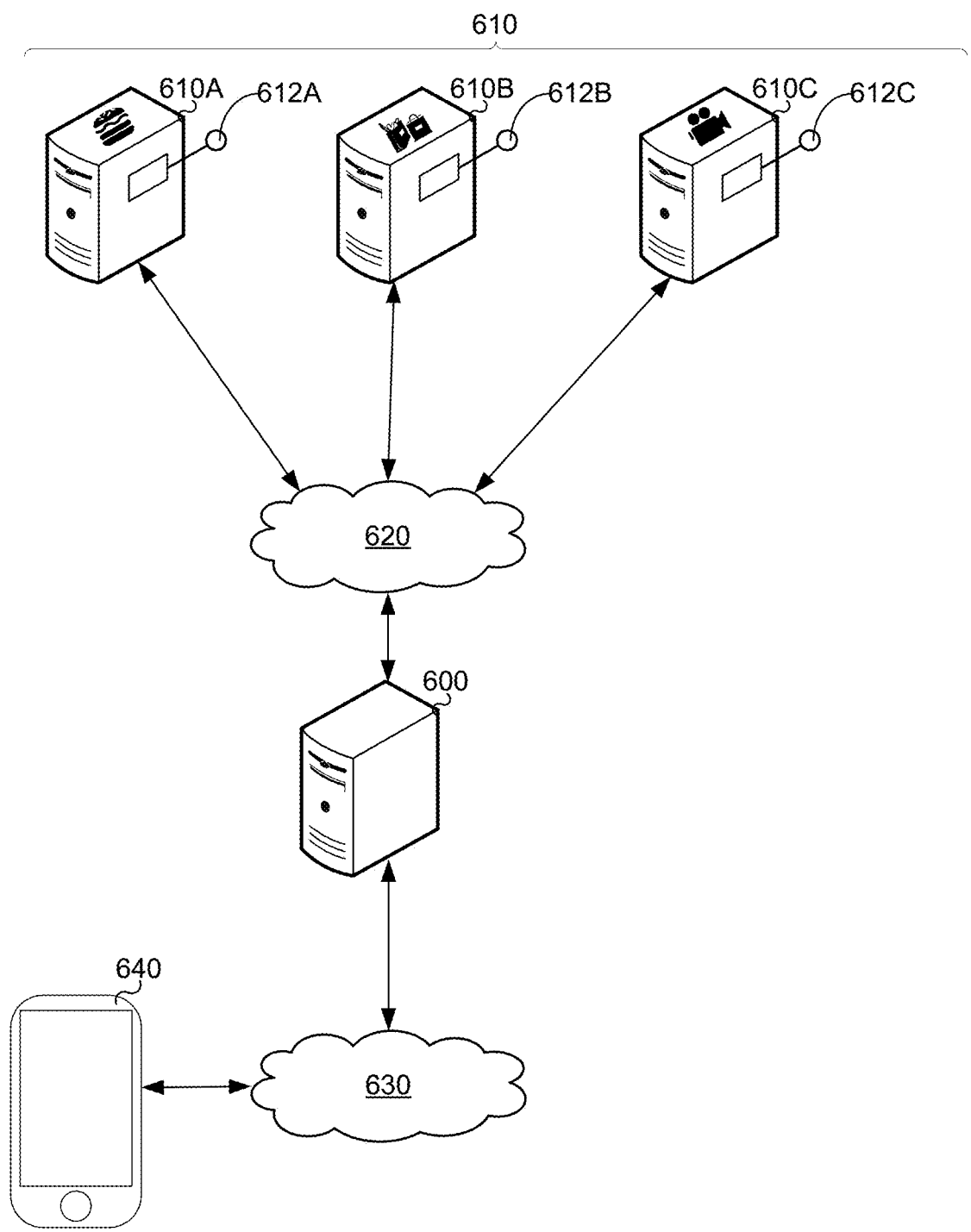
FIG. 6 is a schematic operation diagram illustrating an operating environment of an example application of the subject matter of the present application in manipulation of values related to stored value cards.

A schematic operation diagram illustrating an operating environment related to electronic stored value cards is shown in FIG. 6.

As illustrated, a client computer system 640 is in communication with a stored value card server computer system 600 via a first network 630. The client computer system 640 is geographically remote from the stored value card server computer system 600 and vice-versa.

The stored value card server computer system 600 is also in communication with a set of stored value card merchant computer server systems 610 via a second network 620. For example, as illustrated, the stored value card server computer system 600 may be in communication with a first stored value card merchant computer server system 610A, a second stored value card merchant computer server system 610B, and a third stored value card merchant computer server system 610C, all via the second network 620.

Comparing FIG. 6 to FIG. 1, it is noted that the stored value card server computer system 600 may be considered analogous to the server computer system 100, the second network 620 may be considered analogous to the network 120, the set of stored value card merchant computer server systems 610 may be considered analogous to the set of remote database computer server systems 110 (e.g., the first stored value card merchant computer server system 610A, the second stored value card merchant computer server system 610B, and the third stored value card merchant computer server system 610C may be considered analogous to the first remote database computer server system 110A, the second remote database computer server system 110B, and the third remote database computer server system 110C).

The stored value card server computer system 600 and each member of the set of stored value card merchant computer server systems 610 is a computer server system. As discussed above, computer server systems may take a variety of forms. Suitably-configured instances of the example computer server system 200 may, in some implementations, serve as and/or be a part of the stored value card server computer system 600 and/or one or more members of the set of stored value card merchant computer server systems 610.

The client computer system 640 may be a mobile computing device such as, for example, a smart phone as shown in the FIG. 6. However, the client computer system 640 may be a computing device of another type such as, for example, a personal computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions (using a hardware processor) to perform operations including as described herein.

The client computer system 640 may be configured with software to allow it to act as a mobile wallet. For example, the client computer system 640 may be configured with a mobile wallet application that allows it to be used for making purchases such as, for example, by displaying a machine-readable indicium (e.g., a bar code) associated with a payment method and/or by performing transactions using near-field communication (NFC). In a particular example, the mobile wallet application may store one or more virtual stored value cards that store value, each of which may be used to make purchases from one or more merchants that are associated therewith and/or that accept virtual stored value cards of a given type.

The stored value card server computer system 600 may allow the performing of operations related to stored value cards in real-time and/or near real-time. Clients (e.g., the client computer system 640) may communicate with the stored value card server computer system 600 to perform operations related to stored value cards such as making purchases of new stored value cards and/or reloading existing stored value cards. In another example, as further described below, the stored value card server computer system 600 may be employed in selling the balance of an existing stored value card in exchange for hard currency (e.g., US dollars) and/or for a stored value card of another type loaded with a corresponding balance. In a particular example, the client computer system 640 may co-operate with the stored value card server computer system 600 via the first network 630 to effect the sale of a stored value card.

The stored value card server computer system 600 co-operates with the set of stored value card merchant computer server systems 610 via the second network 620 to perform operations related to stored value cards. More particularly, the stored value card server computer system 600 may receive communications identifying stored value cards and operations to be performed in relation thereto and may then identify relevant member(s) of the set of stored value card merchant computer server systems 610 (e.g., one or more of the first stored value card merchant computer server system 610A, the second stored value card merchant computer server system 610B, or the third stored value card merchant computer server system 610C) with which the stored value card server computer system 600 will communicate in order to effect each of those operations. Yet more particularly, to effect such operations, the stored value card server computer system 600 may invoke one or more functions (also referred to herein variously as methods or primitives) exposed by application programming interfaces (APIs) provided by a given member of the set of stored value card merchant computer server systems 610. For example, as illustrated, each of the first stored value card merchant computer server system 610A, the second stored value card merchant computer server system 610B, and the third stored value card merchant computer server system 610C provides a respective stored value card application programming interface (API), namely a first stored value card merchant API 612A, a second stored value card merchant API 612B, and a third stored value card merchant API 612C and each of those APIs exposes one or more functions related to operations as may be performed on/relative to various stored value cards.

Again comparing FIG. 6 to FIG. 1, it is noted that the stored value card merchant application programming interfaces (APIs) provided by members of the set of stored value card merchant computer server systems 610 (e.g., the first stored value card merchant API 612A, the second stored value card merchant API 612B, and the third stored value card merchant API 612C) may be considered analogous to the application programming interfaces (APIs) provided by members of the set of remote database computer server systems 110 (e.g., the first remote database API 112A, the second remote database API 112B, and the third remote database API 112C).

In some cases, a holder of a stored value card may have a stored value card that they wish to sell. For example, a user associated with the client computer system 640 may have a stored value card they wish to sell. A holder of a stored value card may wish to sell it for a variety of reasons. For example, it may be that the stored value card is only usable at a particular merchant or set of merchants and the holder has no need to purchase anything from that merchant/those merchants and/or that they may have a greater need to use the funds stored on the stored value card for something else. In a more particular example, many people receive stored value cards as gifts and/or incentives, but sometimes stored value cards so received are not of a type associated with a merchant where the recipient likes and/or needs to shop. In such circumstances, the holder may want to sell the stored value card. Historically, selling stored value cards has been difficult. Beyond giving or selling an unneeded stored value card to a friend, people may try to sell stored value cards using classified ads (e.g., using Craigslist, Kijiji, or the like). However, due to fraud risks, many people are reluctant to buy cards from those channels. As an alternative, some companies have emerged that will buy and sell unwanted stored value cards, typically buying them at a discount and making a profit from the spread between the purchase and resale prices of the cards; however, those companies' buying and selling processes are typically very manual and may, for example, rely on exchanging physical stored value cards with the company using postal mail. As further described below, an example application of subject matter of the present application allows processing of sales of such unwanted stored value cards electronically, thereby avoiding manual processes.

The client computer system 640 may, as mentioned above, provide an electronic wallet application. Such an application may offer a variety of functionality. Such functionality may be provided by the client computer system 640 acting in co-operation, directly or indirectly, with the stored value card server computer system 600 via the first network 630 and/or some or all of the set of stored value card merchant computer server systems 610 via the second network 620. For example, provision of such functionality may involve one or more calls to/invocations of methods/ functions/primitives of stored value card merchant application programming interfaces provided such as by members of the set of stored value card merchant computer server systems 610 (e.g., the first stored value card merchant API 612A, the second stored value card merchant API 612B, and the third stored value card merchant API 612C). In a particular example, as further described below, these APIs may also be utilized in order to provide a more efficient and secure stored value card buyback scheme as a part of the electronic wallet application.

By way of overview, for example, a user may be permitted to sell-back an existing stored value card (whether virtual or physical) by first loading it into the electronic wallet application (e.g., by entering in details such as the card number and PIN to add it to the electronic wallet) and by then selecting an option in the electronic wallet application to sell the card. That sale may then be effected using the subject matter of the present application as further described below. In effecting such a sale, a method 700, akin to the method 400 (FIG. 4) may, as discussed below with reference to FIG. 7, be employed to allow use of one or more stored value card merchant APIs to atomically verify and transfer the balance of a stored value card being sold. The stored value card being sold may also be canceled using the API once the transfer is completed. Once a purchase is processed, the seller is paid for the stored value card they sold (e.g., based on the balance less a flat fee and/or a percentage). In some cases, this payment could include issuing a new virtual stored value card of a different type more preferred by the seller and then adding that new card to the seller's electronic wallet (i.e., effectively a card swap).

Figure 7:
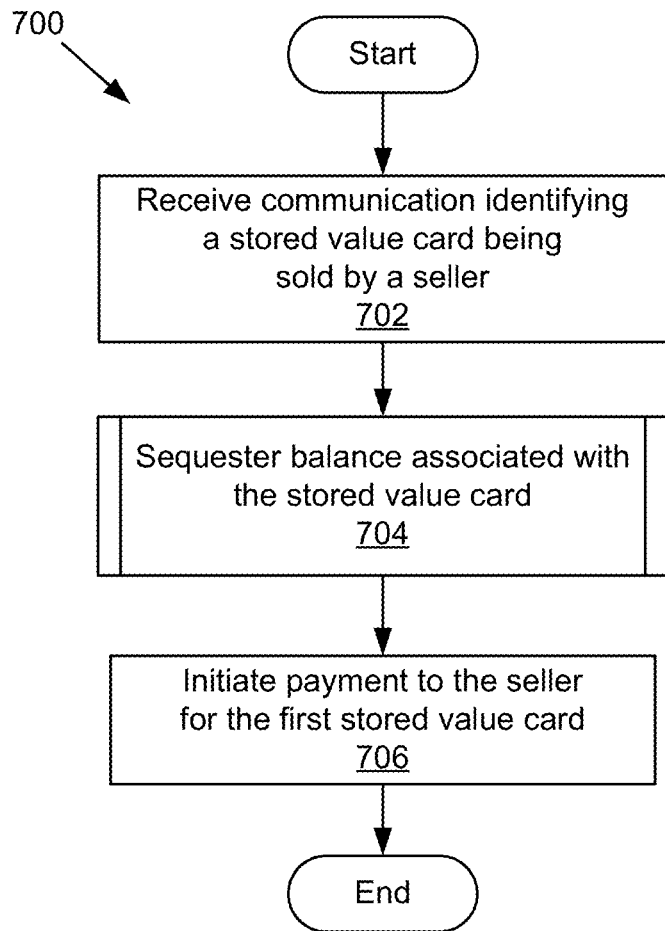
FIG. 7 is a flowchart showing operations performed in transferring a value in a remote database, the value corresponding to a balance of a stored value card.

FIG. 7 provides a flowchart illustrating the method 700. The method 700 is a method for processing a request for a purchase of a virtual stored value card. In performing the method 700, operations starting from an operation 702 and continuing onward are performed by a processor of the stored value card server computer system 600. For example, where the stored value card server computer system 600 is or includes an instance of the example computer server system 200 (FIG. 2), the operations may be performed by the processor 210 executing instructions such as, for example, from the memory 220. Those instructions may, for example, be part of a suitable instance of the application software 310 (FIG. 3).

By way of overview, the method 700 may be considered analogous to the method 400 (FIG. 4) discussed above, with the first value corresponding to an amount stored on a stored value card and tracked by a remote database such as, for example, a database maintained by/accessible using a member of the set of stored value card merchant computer server systems 610.

At the operation 702, a communication is received by the stored value card server computer system 600. The communication may be received via a network such as, for example, the first network 630. The communication may be received from a remote computer system such, as for example, the client computer system 640. The communication may be received by the stored value card server computer system 600 using a communications module thereof. For example, where the stored value card server computer system 600 is or includes an instance of the example computer server system 200, the communication may be received using the communications module 230.

The communication may identify a stored value card ("first stored value card"). The identifying information for the stored value card provided in the communication may take a variety of forms. For example, the communication may include one or both of a card number of the first stored value card and/or a PIN code of the first stored value card. The first stored value card may be being sold by a seller. The first stored value card may be a physical stored value card (physical gift card) or, alternatively, a virtual stored value card (virtual gift card). The first stored value card may be a stored value card of a particular type. As an example, the client computer system 640 may send the communication responsive to user input to sell a stored value card, that input and communication involving, for example, use of the above-mentioned virtual wallet application.

It is noted that the operation 702 may be viewed as analogous to the operation 402 (FIG. 4) of the method 400. For example, the communication identifying a stored value card being sold by a seller also, as further described below, serves to identify a remote database storing a value to be transferred to a first entity by a second entity, namely the balance of the stored value card which is stored in an entry in a remote database and that balance is to be transferred to the buyer (an entity) by the seller (another entity).

Following the receipt of the communication at the operation 702, an operation 704 is next.

At the operation 704, the balance associated with the stored value card is sequestered so as to make it inaccessible to the seller. This sequestration serves to prevent the seller from fraudulently exploiting the stored value card being sold. More particularly, as mentioned above the stored value card and the value (balance) associated therewith is, initially, modifiable by the seller. For example, the seller may use the card to make a purchase, thereby depleting the balance. Accordingly, it is necessary to prevent the seller from exploiting this to, for example, receive a transfer of funds or other value in exchange for the balance on the stored value card at one point, while also rushing to spending the value from the card (e.g., by exploiting timing). For example, such problems are a concern traditionally when selling gift cards by exchanging of physical cards: first, as mentioned, one possible source of fraud in stored value cards are timing attacks whereby a seller knows the number and PIN (if any) associated with a given stored value card they are selling and, in between using that information to provide the card balance to a potential buyer and the sale of the card, they or a confederate perform a transaction (e.g., by using the card to buy something online) to drain the card so that the buyer receives a diminished/empty/depleted card. Sequestering the balance may serve to prevent problems such as these by preventing the seller from modifying the balance before the amount of the payment to them is later determined. For example, by sequestering the balance in this way, the seller may be prevented from fraudulently selling the balance of a stored value card while also using that balance (e.g., to make a purchase) by way of a timing attack as discussed above.

It is noted that the operation 704 may be viewed as analogous to the operation 404 (FIG. 4) of the method 400. For example, the sequestration of the balance associated with the stored value card may be viewed as preventing modification of the database entry representing that balance by the seller.

Figure 8:
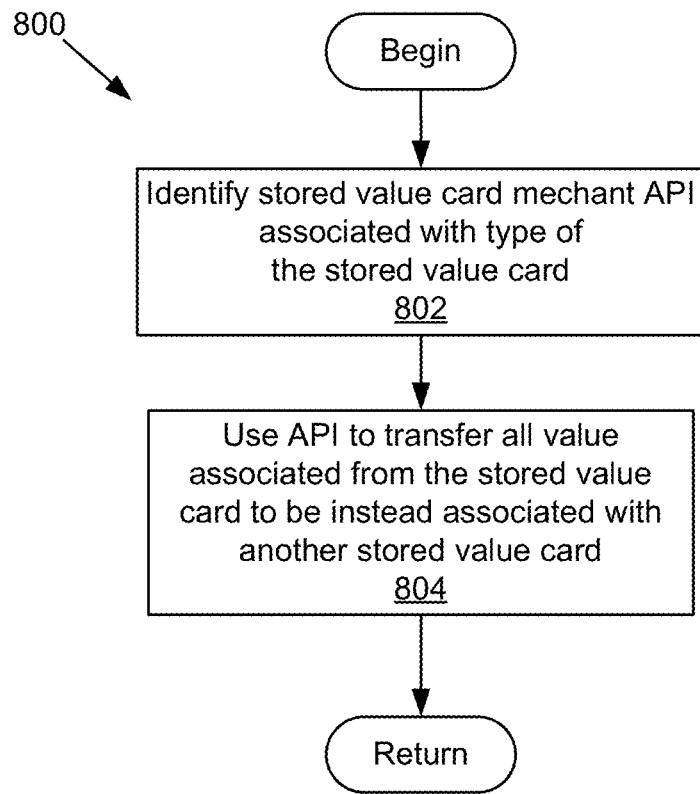
FIG. 8 is a flowchart showing operations performed in preventing modification of a value in a remote database corresponding to a gift card balance to sequester that balance.

An example manner of sequestering the balance associated with a stored value card will now be described with reference to FIG. 8. FIG. 8 provides a flowchart illustrating a method 800 for preventing modification of the first value stored in the remote database by the second entity. The method 800 may be employed in some implementations of the method 700 (FIG. 7), and, in particular, in some implementations of the operation 704 of the method 700. Notably, the method 800 may, in some implementations, be a submethod of the method 700 (FIG. 7) and this may be reflected in at least some such implementations. For example, it may be that the method 800 is implemented a subroutine called by an implementation of the method 700 (e.g., with that subroutine being called in/by an implementation of the operation 704).

In performing the method 800, operations starting from an operation 802 and continuing onward are performed by a processor of the stored value card server computer system 600. For example, where the stored value card server computer system 600 is or includes an instance of the example computer server system 200, the operations may be performed by the processor 210 executing instructions such as, for example, from the memory 220. Those instructions may, for example, be part of a suitable instance of the application software 310 (FIG. 3).

At the operation 802, the stored value card server computer system 600 performs processing to identify an application programming interface for effecting a transfer value from the first stored value card to a second stored value card. The application programming interface is identified from amongst a set of stored value card merchant application programming interfaces (APIs) known to the computing device. An example of such a set of application programming interfaces are the first stored value card merchant API 612A, the second stored value card merchant API 612B and the third stored value card merchant API 612C—i.e., the APIs provided by members of the set of stored value card merchant computer server systems 610.

In order to identify the application programming interface, the processor executing the operation 802 may compare capabilities and/or properties of the APIs from the collection of application programming interfaces to specified requirements.

As an example, it may be that application programming interfaces of various computer systems can each be used to perform operations on stored value cards different types. An example of this is depicted in FIG. 1 where each of the members of the set of first stored value card merchant computer server system 610A is labelled suggestive of a category of stored value card types (gift card types) such as may be accessed thereby. For example, the first stored value card merchant computer server system 610A (and the first stored value card merchant API 612A) are labelled with a hamburger and thus it may be that the first stored value card merchant API 612A is usable to perform operations related to/on food and/or restaurant-related stored value cards, while the second stored value card merchant computer server system 610B (and the second stored value card merchant API 612B) is labelled with a shopping bag and may be usable to perform operations related to/on shopping (e.g., clothing) related stored value cards, while the third stored value card merchant computer server system 610C (and the third stored value card merchant API 612C) is labelled with a film camera and thus may be usable to perform operations related to/on entertainment related stored value cards. Because only some (or even one) of the known stored value card merchant application programming interfaces (i.e., stored value card merchant APIs known/available to the stored value card server computer system 600) may allow operations to be performed relative to stored value cards of given types, the application programming interface may be identified, at least in part, based on a stored value card type identified in the type of the stored value card from which the transfer is being made (e.g., the first stored value card where the method 800 is being used to provide/implement/as a part of the operation 704 (FIG. 7) of the method 700). Put another way, a stored value card merchant API capable of performing operations on a stored value card being sold may be identified based on the type of that stored value card (e.g., a stored value card merchant API allowing operations to be performed on stored value cards of the particular stored value card type indicated in the communication received at the operation 702 may be identified).

It is noted that the operation 802 may be viewed as analogous to the operation 502 (FIG. 5) of the method 500. For example, identifying a stored value card merchant API associated with a stored value card type that allows operations to be performed on stored value cards of that type serves to identify an API will manipulate storage (a database) storing values related to those stored value cards (e.g., balances) in order to effect those operations and may thus be viewed as analogous to identifying a remote database API allowing operations to be performed on that database.

Following the identification of a stored value card merchant API at the operation 802, an operation 804 is next.

At the operation 804, the stored value card merchant application programming interface identified at the operation 802 is used to transfer all value associated with the first stored value card to be instead associated with a second stored value card. The second stored value card may be a virtual stored value card.

Using the stored value card merchant API to transfer the value associated with the first stored value card to the second stored value card may take a variety of forms. For example, it may be that the identified stored value card merchant application programming interface is used to transfer all value associated with the first stored value card so that it is instead associated with the second, virtual stored value card includes calls to multiple methods of the API. In a particular example, a first method of the identified stored value card merchant application programming interface may be called to transfer the balance associated with the first stored value card to be instead associated with the second stored value card. Then, it may be confirmed that the balance initially associated with the first stored value card is now associated with the second, virtual stored value card. Such confirmation may take a variety of forms. For example, it may be that a return result of the call to the aforementioned first method of the identified stored value card merchant application programming interface is inspected. In another example, a second method of the identified stored value card merchant application programming interface may be invoked after the first method is called so as to retrieve a balance associated with the second stored value card after the transfer and confirm the amount transferred to the second stored value card. For example, that the transfer was of the expected amount may be so confirmed.

The second stored value card may take a variety of forms. In a first example, the second stored value card may be created for the purpose of receiving the transferred value. For example, it may be that, prior to performing the actual transfer of value, the second stored value card is created such as by using the identified stored value card merchant application programming interface to create a new virtual stored value card of a particular stored value card type, namely the type of the stored value card from which value is being sequestered (e.g., the first stored value card). In some implementations, such a second stored value card may be created prior to or as a part of the sequestration (e.g., prior to the operation 704 (FIG. 7) of the method 700). In a second example, the second stored value card may be an existing card. For example, it may be a virtual stored value card of the particular stored value card type used for pooling value obtained by way of purchases of stored value cards of a given stored value card type. Put another way, a virtual stored value card of the particular stored value card type may be used for pooling value transferred from (all or some) stored value cards of that type as they are purchased.

Whatever its the nature of the second stored value card and the manner of using the identified stored value card merchant to transfer to identifiers associated therewith, following the use of the API to effect that transfer at the operation 804, the method 800 completes. Where the method 800 is employed in the implementation of the operation 704 (FIG. 7) of the method 700, the completion of the method 700 may also correspond to completion of the operation 704.

It is noted that the operation 804 may be viewed as analogous to the operation 504 (FIG. 5) of the method 500. For example, using an API to transfer the balance of a stored value card to instead be associated with another stored value card may be viewed as using an API to transfer value to be associated with identifiers unknown to a second entity (the seller of that stored value card) insofar as identifiers (e.g., stored value card number/PIN) for the second stored value card are unknown to the seller.

Returning to consideration of FIG. 7, following sequestration of the balance at the operation 704, an operation 706 is next.

At the operation 706, a payment to the seller for the first stored value card is initiated. The amount of the transfer may be based on the amount of the transferred value. In some implementations, the amount of the transferred value may be based on the balance associated with a stored value card (e.g., the above-discussed second stored value card) after a transfer thereto. For example, such a balance may be obtained as a part of inspecting/confirming the balance of the second stored value card as a part of an implementation of the operation 804 (FIG. 8) of the method 800.

Notably, the nature of the payment may vary.

In a first example of a possible form of payment, it may be that the payment corresponds to (i.e., is or includes) a transfer of currency (e.g., a cash credit spendable anywhere) to the seller or to some other third party (e.g., as may be designated by the seller).

In a second example of a possible form of payment, the payment to the seller for the first stored value card may be or may include provision of another stored value card to the seller or to some third party (e.g., as may be designated by the seller). For example, the seller could receive another stored value card (e.g., a virtual stored value card) of a different stored value card type as full or partial payment for the stored value card being sold. Notably, this may be used to effect a stored value card swap of a card of a first type for a card of a second type. For example, such functionality could be provided in this way as a part of a mobile wallet application such as was mentioned above.

Such a provision of a stored value card to the seller may be achieved in a variety of manners. For example, it may be that a stored value card merchant application programming interface (potentially the same API or a different one than that identified as a part of effecting the sequestration) may be utilized to create a new virtual stored value card of the different card type. That API may then be also utilized to associated value with the newly-created virtual stored value card. For example, the stored value card could be loaded with value in the amount of the intended payment to the seller (or a portion thereof). The newly-created stored value card may then be provided to the seller as the part of the payment thereto.

Notably, whatever the form of payment provided to the seller, it may be that the amount/value thereof is based on the amount of the transferred value minus (less) one or more fees (e.g., a service charge fee). Such fees could, for example, be one or both of a fixed amount and/or a percentage (e.g., of the balance).

It is noted that the operation 706 may be viewed as analogous to the operation 406 (FIG. 4) of the method 400. For example, initiating a payment to the seller for the first stored value card may be viewed triggering a transfer to a second entity (i.e., the seller) as payments may be viewed as data transfers (e.g., between database records representing account balances).

Following the operation 706, the method 700 is completed.

Variations of the method 700 are possible. For example, in some implementations, the first stored value card may be cancelled after transferring all value associated with the first stored value card away from that stored value card and to be instead associated with another stored value card. For example, the first stored value card could be cancelled as a part of the sequestration at the operation 704. In a particular example, where the method 800 (FIG. 8) is employed in implementing the operation 704, the first stored value card may be cancelled following completion of the operation 804.

Electronic purchases of stored value cards using the method 700 may incur a lower overhead as compared to existing buyback schemes that involve manual processing due, for example, to avoidance of the need to handle physical stored value cards (e.g., by the buyer) when the method 700 is employed.

Value obtained by a buyer from purchasing of stored value cards may be employed in a variety of manners.

In a first example, the second stored value card could, if allowed by a stored value card merchant API for stored value cards of that type, refunded allowing the purchaser to receive cash/hard currency for the card. Notably, the buyer may be entitled to use the API (e.g., as a trusted stored value card merchant) and thus may be able to refund a stored value card where others (e.g., the seller) who are not stored value card merchants cannot.

In a second example, purchased stored value card value may be used by the buyer/purchaser to satisfy requests from others to purchase new stored value cards (e.g., in lieu of the merchant processing a purchase of a new stored value card of that type using a suitable stored value card merchant API) by satisfying them with/from/using previously-purchased balances.

Manners of satisfying a stored value card purchase using purchased balances may vary.

In a first example, where a virtual stored value card of a particular type pools the value transferred from purchased stored value cards of that type, a communication requesting to purchase a virtual stored value card of a given type loaded with particular value (its intended balance) may be satisfied by creating a new virtual stored value card of the particular stored value card type being purchased (e.g., using a suitable stored value card merchant API) and then transferring value from the card holding the pooled value to the newly-created card in the amount of the intended value (or less if the full intended value is not available), with that newly-created card then being utilized to satisfy the purchase. Notably, where the intended balance of the card being purchased cannot be fully satisfied from the pooled value, it may be topped-up with sufficient value to bring its balance to the intended balance (e.g., using a reload operation/primitive provided by suitable stored value card merchant API to perform the top-up).

In another example, where new virtual stored value cards are created to hold each purchased balance, it may be that those virtual stored value cards are maintained in a pool. In a particular example, where a communication requesting to purchase a virtual stored value card of a given type loaded with particular value (its intended balance) is received, that pool of virtual stored value cards may be searched to identify a virtual stored value card matching the request (e.g., a virtual stored value card of the correct type). The identified stored value card may then be used to satisfy the request directly (e.g., if the identified already holds the intended balance). Alternatively, a suitable stored value card merchant API may be used to create a new virtual stored value card of the particular stored value card type being purchased. That API may then be used to transfer value from the identified virtual card to instead be associated with the new virtual stored value card. In some cases, the transfer may be partial (e.g., where the identified stored value card has greater value than that requested for purchase). Additionally or alternatively, in some cases, more than one stored value card may be identified from the pool, with balances of those identified cards then being transferred, in whole or in part to one card, thereby aggregating the balanced together (e.g., where the intended balance is greater than the balance of some or all of the identified cards individually).

Notably, a reload of an existing stored value card may be effected in a similar manner by transferring values from one or more cards holding purchased balances to the stored value card being reloaded so as to satisfy the reload.

Whether a given request is a reload or a transfer, if there is insufficient value in the balance of stored value cards of a given type in a pool of stored value cards to satisfy a purchase/reload request related to that card type, it may be that value from those cards is used to satisfy the purchase request in part and then the stored value card merchant API is used to top-up the value to the requested amount (e.g., by processing a conventional load/reload using the API). Notably, as mentioned above, a similar top-up may also be performed in the case where a single virtual stored value card was used to pool value transferred from stored value cards of a given type.

Computer systems, computer-implemented methods, and computer-readable media such as may be provided in relation to the above-discussed example application scenario will now be detailed.

In an example application of the subject-matter of the present application, there may be provided a computer system. The computer system may include a processor. The computer system may include a communications module coupled to the processor. The computer system may include a memory coupled to the processor. The memory may store instructions that, when executed by the processor, cause the computer system to: receive, using the communications module via a network, a communication identifying a first gift card being sold by a seller, the first gift card being of a particular gift card type; and sequester a balance associated with the first gift card. The sequestering may include: identifying, from amongst a plurality of gift card merchant application programming interfaces, a gift card merchant application programming interface associated with the particular gift card type, and using the identified gift card merchant application programming interface to transfer all value associated with the first gift card to be instead associated with a second, virtual gift card. The instructions, when executed by the processor, may further cause the computer system to: initiate a payment to the seller for the first gift card. The amount of the payment may be based on the amount of the transferred value.

In some implementations of such a computer system, using the identified gift card merchant application programming interface to transfer all value associated with the first gift card so that it is instead associated with the second, virtual gift card may include: calling a first method of the identified gift card merchant application programming interface to transfer the balance associated with the first gift card to be instead associated with the second, virtual gift card; and confirming that the balance initially associated with the first gift card is now associated with the second, virtual gift card. Confirming that the balance initially associated with the first gift card is now associated with the second, virtual gift card may include inspecting a return result of the call to the first method of the identified gift card merchant application programming interface. Using the identified gift card merchant application programming interface to transfer all value associated with the first gift card so that it is instead associated with the second, virtual gift card may further include: initiating the payment to the seller for the first gift card responsive to confirming that the balance associated with the first gift card is now associated with the second, virtual gift card. The amount of the payment may be based on the transferred balance.

In some implementations of such a computer system, the instructions, when executed, may further cause the computer system to: prior to sequestering the value stored on the first gift card, create the second, virtual gift card by using the identified gift card merchant application programming interface to create a new virtual gift card of the particular gift card type.

In some implementations of such a computer system, the second, virtual gift card may be an existing virtual gift card of the particular gift card type used for pooling value obtained by way of purchases of gift cards of the particular gift card type.

In some implementations of such a computer system, the instructions, when executed, may further cause the computer system to: receive, using the communications module via a network, a communication requesting to purchase a third virtual gift card of the particular gift card type loaded with a particular value; and search a pool of virtual gift cards to identify a virtual gift card matching the request. The pool of virtual gift cards may include virtual gift cards obtained by way of purchases of gift cards including the second, virtual gift card. The instructions, when executed, may further cause the computer system to: satisfy the request to purchase the third virtual gift card using the second, virtual gift card. Satisfying the request to purchase the third virtual gift card using the second, virtual gift card may include: using the identified gift card merchant application programming interface to create a new virtual gift card of the particular gift card type, and using the identified gift card merchant application programming interface to transfer the particular value from being associated with the second, virtual gift card to being instead associated with the new virtual gift card.

In some implementations of such a computer system, the instructions, when executed, may further cause the computer system to: cancel the first gift card after transferring all value associated with the first gift card to be instead associated with the second, virtual gift card.

In an example application of the subject-matter of the present application, there may be provided a computer-implemented method. The method may include: receiving, via a network, information identifying a first gift card being sold by a seller, the first gift card being of a particular gift card type; and sequestering a balance associated with the first gift card. The sequestering may include: identifying, from amongst a plurality of gift card merchant application programming interfaces, a gift card merchant application programming interface associated with the particular gift card type, and using the identified gift card merchant application programming interface to transfer all value associated with the first gift card to be instead associated with a second, virtual gift card. The method may further include: initiating a payment to the seller for the first gift card. An amount of the payment may be based on the amount of the transferred value.

In some implementations of such a method, using the identified gift card merchant application programming interface to transfer all value associated with the first gift card so that it is instead associated with the second, virtual gift card may include: calling a first method of the identified gift card merchant application programming interface to transfer the balance associated with the first gift card to be instead associated with the second, virtual gift card; confirming that the balance initially associated with the first gift card is now associated with the second, virtual gift card; and initiating the payment to the seller for the first gift card responsive to confirming that the balance associated with the first gift card is now associated with the second, virtual gift card. The amount of the payment may be based on the transferred balance.

In some implementations of such a method, confirming that the balance initially associated with the first gift card is now associated with the second, virtual gift card may include inspecting a return result of the call to the first method of the identified gift card merchant application programming interface.

In some implementations of such a method, using the identified gift card merchant application programming interface to transfer all value associated with the first gift card so that it is instead associated with the second, virtual gift card may include: calling a first method of the identified gift card merchant application programming interface to transfer a balance associated with the first gift card to be instead associated with the second, virtual gift card; after the transfer completes, calling a second method of the identified gift card merchant application programming interface to retrieve a balance associated with the second, virtual gift card after the transfer; and determining the amount of the transferred value based on the balance associated with the second, virtual gift card after the transfer.

In some implementations of such a method, the method may further include: prior to sequestering the value stored on the first gift card, creating the second, virtual gift card by using the identified gift card merchant application programming interface to create a new virtual gift card of the particular gift card type.

In some implementations of such a method, the second, virtual gift card may be an existing virtual gift card of the particular gift card type used for pooling value obtained by way of purchases of gift cards of the particular gift card type.

In some implementations of such a method, the payment to the seller for the first gift card may include a third virtual gift card of a different gift card type from the first gift card type.

In some implementations of such a method, initiating the payment to the seller for the first gift card may include: creating the third virtual gift card by using the identified gift card merchant application programming interface to create a new virtual gift card of the different gift card type; and using the identified gift card merchant application programming interface to associated value in the amount of the payment with the third virtual gift card. The third virtual gift card may be provided to the seller as a part of the payment.

In some implementations of such a method, the method may further include: receiving a request to purchase a third virtual gift card of the particular gift card type loaded with a particular value; and searching a pool of virtual gift cards to identify a virtual gift card matching the request. The pool of virtual gift cards may include virtual gift cards obtained by way of purchases of gift cards including the second, virtual gift card. The method may further include: satisfying the request to purchase the third virtual gift card using the second, virtual gift card.

In some implementations of such a method, satisfying the request to purchase the third virtual gift card using the second, virtual gift card may include: using the identified gift card merchant application programming interface to create a new virtual gift card of the particular gift card type; and using the identified gift card merchant application programming interface to transfer the particular value from being associated with the second, virtual gift card to being instead associated with the new virtual gift card.

In some implementations of such a method, satisfying the request to purchase the third virtual gift card using the second, virtual gift card may include: determining that the second, virtual gift card has a balance less than or equal to the particular value; using the identified gift card merchant application programming interface to reload the second, virtual gift card with an amount selected to top-up the balance associated with the second, virtual gift card to the particular value; and providing the second, virtual gift card as the third gift card to satisfy the request.

In some implementations of such a method, the amount of the payment may be based on the amount of the transferred value less a service charge fee.

In some implementations of such a method, the first gift card may be a physical gift card.

In some implementations of such a method, the information identifying the first gift card may include a card number of the first gift card and a PIN code of the first gift card.

In an example application of the subject-matter of the present application, there may be provided a computer-readable medium. The medium may be non-transitory. The medium may be a storage medium. The medium may store instructions that, when executed by a processor of a computer system, cause the computer system to perform the above-discussed method as may be provided in an example application of the subject-matter of the present application.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a processor;
   a communications module coupled to the processor; and
   a memory coupled to the processor and storing instructions that, when executed by the processor, cause the computer system to:
      receive, using the communications module via a network, a communication identifying a remote database and including one or more identifiers associated with a first value stored in the remote database and being transferred to a first entity by a second entity, wherein the first value is modifiable by the second entity using the identifiers;
      prevent modification of the first value stored in the remote database by the second entity, the preventing including:
         identifying, from amongst a plurality of application programming interfaces, an application programming interface allowing operations to be performed on the remote database, and
         using the identified application programming interface to transfer the first value associated with the one or more identifiers to be instead associated with one or more other identifiers unknown to the second entity and associated with the first entity; and
      after preventing modification of the first value stored in the remote database by the second entity, trigger a transfer of a second value to a database record associated with the second entity, the second value based on the first value.

2. The computer system of claim 1, wherein using the identified application programming interface to transfer the first value associated with the one or more identifiers to be instead associated with the one or more other identifiers unknown to the second entity includes:
   calling a first method of the identified application programming interface to transfer the first value associated with the one or more identifiers to be instead associated with the one or more other identifiers unknown to the second entity; and
   confirming that the first value initially associated with the one or more identifiers is no longer associated with the one or more identifiers and is instead now associated with the one or more other identifiers, wherein the confirming includes inspecting a return result of the call to the first method of the identified application programming interface,
   wherein the transfer of the second value to the database record associated with the second entity is triggered responsive to confirming that the first value initially associated with the one or more identifiers is no longer associated with the one or more identifiers and is instead now associated with the one or more other identifiers.

3. The computer system of claim 1, wherein the first value stored in the remote database corresponds to an amount stored on a stored value card.

4. The computer system of claim 3, wherein the stored value card is of a particular stored value card type, and wherein the identified application programming interface is a stored value card application programming interface allowing operations to be performed on stored value cards of the particular stored value card type.

5. The computer system of claim 4, wherein preventing modification of the first value stored in the remote database by the second entity further includes:
   using the stored value card application programming interface to create a second, virtual stored value card of the particular stored value card type, wherein the one or more other identifiers identify the second, virtual stored value card.

6. The computer system of claim 5, wherein the instructions, when executed, further cause the computer system to:
   receive, using the communications module via the network, a request to purchase a third virtual stored value card of the particular stored value card type storing a particular value;
   search a pool of virtual stored value cards to identify a virtual stored value card matching the request, the pool of virtual stored value cards including the second, virtual stored value card; and
   satisfy the request to purchase the third virtual stored value card using the second, virtual stored value card.

7. The computer system of claim 4, wherein the instructions, when executed, further cause the computer system to:
   after preventing modification of the first value stored in the remote database by the second entity, use the stored value card application programming interface to cancel the stored value card.

8. A computer-implemented method comprising:
receiving, via a network, a communication identifying a remote database and including one or more identifiers associated with a first value stored in the remote database and being transferred to a first entity by a second entity, wherein the first value is modifiable by the second entity using the identifiers;
preventing modification of the first value stored in the remote database by the second entity, the preventing including:
identifying, from amongst a plurality of application programming interfaces, an application programming interface allowing operations to be performed on the remote database, and
using the identified application programming interface to transfer the first value associated with the one or more identifiers to be instead associated with one or more other identifiers unknown to the second entity and associated with the first entity; and
after preventing modification of the first value stored in the remote database by the second entity, triggering a transfer of a second value to a database record associated with the second entity, the second value based on the first value.

9. The method of claim 8, wherein using the identified application programming interface to transfer the first value associated with the one or more identifiers to be instead associated with the one or more other identifiers unknown to the second entity includes:
calling a first method of the identified application programming interface to transfer the first value associated with the one or more identifiers to be instead associated with the one or more other identifiers unknown to the second entity; and
confirming that the first value initially associated with the one or more identifiers is no longer associated with the one or more identifiers and is instead now associated with the one or more other identifiers,
wherein the transfer of the second value to the database record associated with the second entity is triggered responsive to confirming that the first value initially associated with the one or more identifiers is no longer associated with the one or more identifiers and is instead now associated with the one or more other identifiers.

10. The method of claim 9, wherein the confirming includes inspecting a return result of the call to the first method of the identified application programming interface.

11. The method of claim 8, wherein the first value stored in the remote database corresponds to an amount stored on a stored value card.

12. The method of claim 11, wherein the stored value card is a physical stored value card.

13. The method of claim 12, wherein the one or more identifiers include a card number of the stored value card and a PIN code of the stored value card.

14. The method of claim 11, wherein the stored value card is of a particular stored value card type, and wherein the identified application programming interface is a stored value card application programming interface allowing operations to be performed on stored value cards of the particular stored value card type.

15. The method of claim 14 wherein the one or more other identifiers identify a second, virtual stored value card of the particular stored value card type.

16. The method of claim 15, wherein preventing modification of the first value stored in the remote database by the second entity further includes:
using the stored value card application programming interface to create the second, virtual stored value card.

17. The method of claim 15, wherein the second, virtual stored value card is used for pooling values transferred from stored value cards of the particular stored value card type.

18. The method of claim 15, further comprising:
receiving, via the network, a request to purchase a third virtual stored value card of the particular stored value card type storing a particular value;
searching a pool of virtual stored value cards to identify a virtual stored value card matching the request, the pool of virtual stored value cards including the second, virtual stored value card; and
satisfying the request to purchase the third virtual stored value card using the second, virtual stored value card.

19. The method of claim 8, wherein triggering the transfer of the second value to the database record associated with the second entity includes:
using a second stored value card application programming interface to create a new virtual stored value card of a different stored value card type; and
using the second stored value card application programming interface to load the new virtual stored value card with the second value.

20. The method of claim 8, wherein the transfer of the second value to the database record associated with the second entity corresponds to a payment to the second entity.

* * * * *